United States Patent
Broyde et al.

(10) Patent No.: US 7,477,069 B2
(45) Date of Patent: Jan. 13, 2009

(54) DIGITAL METHOD AND DEVICE FOR TRANSMISSION WITH REDUCED CROSSTALK

(75) Inventors: Frederic Broyde, Maule (FR); Evelyne Clavelier, Maule (FR)

(73) Assignee: ZXtalk Assets, LLC, Wilmington, DE (US)

( * ) Notice: Subject to any disclaimer, the term of this patent is extended or adjusted under 35 U.S.C. 154(b) by 659 days.

(21) Appl. No.: 10/547,083

(22) PCT Filed: Feb. 18, 2004

(86) PCT No.: PCT/EP2004/002382

§ 371 (c)(1),
(2), (4) Date: Aug. 26, 2005

(87) PCT Pub. No.: WO2004/079941

PCT Pub. Date: Sep. 16, 2004

(65) Prior Publication Data

US 2006/0171476 A1    Aug. 3, 2006

(30) Foreign Application Priority Data

Mar. 6, 2003   (FR) .................................. 03 02814

(51) Int. Cl.
*H03K 17/16* (2006.01)
*H03K 19/003* (2006.01)
(52) U.S. Cl. .............................. 326/30; 326/26; 333/12; 345/58; 439/941
(58) Field of Classification Search .................. 326/21, 326/26, 30; 333/12; 345/58; 439/941
See application file for complete search history.

(56) References Cited

U.S. PATENT DOCUMENTS 5,027,088 A * 6/1991 Shimizu et al. ................. 333/1

(Continued)

FOREIGN PATENT DOCUMENTS

EP    0756397    1/1997

(Continued)

OTHER PUBLICATIONS

Abushaaban et al., Modal Circuit Decomposition of Lossy Multiconductor Transmission Lines, IEEE Transactionson Microwave Theory and Techniques, IEEE Inc. (New York), vol. 44 (No. 7), pp. 1046-1056, (Jul. 1, 1996).

(Continued)

*Primary Examiner*—Rexford Barnie
*Assistant Examiner*—Jason Crawford
(74) *Attorney, Agent, or Firm*—McDonnell Boehnen Hulbert & Berghoff LLP

(57) ABSTRACT

The invention relates to a method and a device for transmission with reduced crosstalk in interconnections used for sending a plurality of signals, such as the interconnections made with flat multiconductor cables, or with the tracks of a printed circuit board, or inside an integrated circuit. An interconnection with four parallel transmission conductors plus a reference conductor has each of its ends connected to a termination circuit. The transmitting circuit receives at its input the signals of the four channels of the source and its output terminals are connected to the conductors of the interconnection. The receiving circuit(s) input terminals are connected to the conductors of the interconnection, and its four output channels are connected to the destination. The signals of the four channels of the source are sent to the four channels of the destination, without noticeable crosstalk.

16 Claims, 6 Drawing Sheets

U.S. PATENT DOCUMENTS

| | | | |
|---|---|---|---|
| 5,278,536 A | | 1/1994 | Furtaw et al. |
| 5,374,861 A | * | 12/1994 | Kubista ................. 326/30 |
| 5,457,406 A | * | 10/1995 | Takada et al. ............ 326/30 |
| 5,502,392 A | * | 3/1996 | Arjavalingam et al. ...... 324/638 |
| 6,060,907 A | * | 5/2000 | Vishwanthaiah et al. ...... 326/87 |
| 6,211,703 B1 | * | 4/2001 | Takekuma et al. .......... 326/101 |
| 7,167,019 B2 | * | 1/2007 | Broyde et al. ............ 326/30 |
| 7,208,888 B2 | | 4/2007 | Lovato et al. |
| 7,362,130 B2 | * | 4/2008 | Broyde et al. ............ 326/30 |
| 7,408,426 B2 | * | 8/2008 | Broyde et al. ........... 333/100 |
| 2002/0167701 A1 | | 11/2002 | Hirata |
| 2005/0135811 A1 | | 6/2005 | Lee et al. |

FOREIGN PATENT DOCUMENTS

| | | |
|---|---|---|
| EP | 1 109 328 A | 6/2001 |
| EP | 1564914 | 8/2005 |
| GB | 2392586 | 3/2004 |
| JP | 2004147063 | 5/2004 |
| WO | WO99/41876 | 8/1999 |
| WO | WO 00/40892 | 7/2000 |

OTHER PUBLICATIONS

El-Zein et al., An analytical method for finding the maximum crosstalk in lossless-coupled transmission lines, Proceedings of the IEEE International Conference, pp. 443-448, (Nov. 8, 1992).

Scott, Propagation over multiple parallel transmission lines via modes, IBM Technical Disclosure Bulletin, IBM Corp. (New York), vol. 32 (No. 11), pp. 1-6, (Apr. 1, 1990).

Guo-Lin Li et al., Lin-modes decomposition of three-conductor transmission lines, Microwave Conference, 2000 Asia-Pacific, IEEE (Sydney, Australia), pp. 1031-1034, (Dec. 3, 2000).

Toshihiko Komine and Masao Nakagawa, "Integrated System of White Led Visible-Light Communication and Power-Line Communication" dep. of Inform. and Computer Science, Keio Univ., pp. 1762-1766, PIMRC 2002 Month N/A.

* cited by examiner

DIGITAL METHOD AND DEVICE FOR TRANSMISSION WITH REDUCED CROSSTALK

CROSS REFERENCE TO RELATED APPLICATIONS

This is the U.S. National Phase of PCT/EP2004/002382, filed Feb. 18, 2004, which in turn claims priority to French Application No. 03/02814, filed Mar. 6, 2003, both of which are incorporated herein in their entirety by reference.

FIELD OF THE INVENTION

The invention relates to a digital method and a digital device for transmission with reduced crosstalk through interconnections used for sending a plurality of signals, such as the ones made with flat multiconductor cables, or with the tracks of a printed circuit board, or inside an integrated circuit.

The French patent application number 0302814 of 6 Mar. 2003, entitled "Procédé et dispositif numériques pour la transmission avec une faible diaphonie" is incorporated by reference.

PRIOR ART

Let us consider the theoretical problem of an interconnection with n transmission conductors placed close to a reference conductor. Let us number these conductors from 0 to n, where 0 is the "reference conductor" which will be used as a reference for measuring voltages, and which is often called the ground conductor.

We define any point along an interconnection of length L with a real curvilinear abscissa z, the interconnection extending from z=0 to z=L.

Any integer j greater than or equal to 1 and less than or equal to n corresponds to the number of a transmission conductor of the interconnection, that is to say to a conductor other than the reference conductor. This integer may therefore be used as an index in order to define, for each transmission conductor, two electrical variables, i.e. one current and one voltage. At a given abscissa z along the cable, we define in this manner the current $i_j$ flowing in the transmission conductor, and the voltage $v_j$ between the transmission conductor and the reference conductor. These n currents and these n voltages are respectively called natural currents and natural voltages. The wording "natural electrical variable" will indiscriminately designate a natural current or a natural voltage.

The vocabulary and the definitions which we will use are those of the French patent application number 0300064 of 6 Jan. 2003, entitled "Procédé et dispositif pour la transmission avec une faible diaphonie", and of the international application number PCT/EP03/15036 of 24 Dec. 2003, entitled "Method and device for transmission with reduced crosstalk". In particular, the following definitions and wordings are concerned:

"multiconductor transmission line",
"per-unit-length inductance matrix" or "L matrix",
"per-unit-length resistance matrix" or "R matrix",
"per-unit-length capacitance matrix" or "C matrix",
"per-unit-length conductance matrix" or "G matrix",
"uniform multiconductor transmission line",
"column-vector I of the natural currents $i_1, \ldots, i_n$",
"column-vector V of the natural voltages $v_1, \ldots, v_n$",
"telegrapher's equations",
"modal current",
"modal voltage",
"column-vector $I_M$ of the modal currents $i_{M1}, \ldots, i_{Mn}$",
"column-vector $V_M$ of the modal voltages $V_{M1}, \ldots, V_{Mn}$",
"transition matrix from modal voltages to natural voltages" or "S matrix",
"transition matrix from modal currents to natural currents" or "T matrix",
"modal electrical variable",
"transition matrix from modal electrical variables to natural electrical variables",
"characteristic impedance matrix" or "$Z_C$ matrix",
"propagation constant" for a mode.

The prior art applicable to this application includes: the prior art presented in the above-mentioned French patent application no. 0300064 and international application no. PCT/EP03/15036, and the invention described in them.

The invention presented in the above-mentioned French patent application no. 0300064 and international application no. PCT/EP03/15036 indeed allows reducing crosstalk efficiently, and is applicable to both analog signals and digital signals. However, for combining in a transmitting circuit the m input signals, according to linear combinations defined by a transition matrix from modal electrical variables to natural electrical variables, in order to obtain at the output of the transmitting circuit the generation of modal electrical variables, and for combining in a receiving circuits, the input of which is connected to the n transmission conductors, the signals present on the transmission conductors, according to linear combinations defined by the inverse of the transition matrix from modal electrical variables to natural electrical variables, so as to obtain at the output of the receiving circuit m output signals each corresponding to one of the transmission channels, each output signal being proportional to a single modal electrical variable, these applications only mention, as examples, analog devices. This approach may in some cases, especially when the number of transmission channels is large, require the implementation of analog circuits comprising a large number of components in order to obtain all the linear combinations.

DESCRIPTION OF THE INVENTION

The purpose of the method of the invention is the transmission with reduced crosstalk through interconnections with two or more transmission conductors, without the limitations of known techniques.

The invention is about a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the method comprising the steps of:

modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

determining, for the multiconductor transmission line and the known frequency band, the characteristic impedance matrix and a transition matrix from modal electrical variables to natural electrical variables;

placing at at least one end of the interconnection, a termination circuit having an impedance matrix approximating the characteristic impedance matrix;

combining the m input signals in one of the transmitting circuits, according to linear combinations defined by the transition matrix from modal electrical variables to natural electrical variables, using a digital processing and a conversion of the digital signals produced by the digital processing into n analog signals, so as to obtain at the output of said one of the transmitting circuits, output being connected to the n transmission conductors, the generation of modal electrical variables, each being proportional to a single signal among the input signals; and combining in one of the receiving circuits, the input of which is connected to the n transmission conductors, the analog signals present on the transmission conductors, according to linear combinations defined by the inverse of the transition matrix from modal electrical variables to natural electrical variables, using a conversion of the n analog signals into digital signals and a digital processing of the digital signals produced by the conversion, so as to obtain at the output of said one of the receiving circuits m output signals each corresponding to one of the transmission channels, each output signal being proportional to a single modal electrical variable among the modal electrical variables.

The person skilled in the art fully understands the principles implemented by the invention. As in the above-mentioned French patent application no. 0300064 and international application no. PCT/EP03/15036, it uses a superposition of waves being each composed of a single modal electric variable corresponding to a channel, because the properties of these waves, produced with a suitable conversion in one of the transmitting circuits and used with an inverse conversion in one of the receiving circuits, enable transmission without crosstalk between the channels.

As in the above-mentioned French patent application no. 0300064 and international application no. PCT/EP03/15036, and for the same reasons, according to the method of the invention we may:

either arrange at one end only of the interconnection, a termination circuit with an impedance matrix near the characteristic impedance matrix, or arrange at both ends of the interconnection, a termination circuit with an impedance matrix near the characteristic impedance matrix.

As in the above-mentioned French patent application no. 0300064 and international application no. PCT/EP03/15036, in order that this principle results in the desired characteristics, it is important that the interconnection behaves like a multiconductor transmission line uniform over its length, because a lack of homogeneity such as a variation of the characteristic impedance matrix with respect to z may produce detrimental couplings between the channels, that is to say, crosstalk.

In some cases, in order to take into account the lumped impedances seen by the interconnection and caused by the circuits connected to it elsewhere than at its ends, the designer need only observe that they are not present or that they may be ignored. In other cases, in order to take into account the lumped impedances seen by the interconnection and caused by the circuits connected to it elsewhere than at its ends, the designer must quantitatively consider these lumped impedances to obtain a multiconductor transmission line having sufficiently uniform electrical characteristics over its length. For instance, the interconnection could see a receiving circuit as a capacitance matrix adding to its own capacitance matrix: this lumped capacitance could therefore be offset by a suitably proportioned local modification of the geometrical characteristics of the interconnection in the vicinity of the connection point. As a second example, capacitance matrices localized at connection points regularly spaced along the interconnection could be taken into account to obtain a prescribed average per-unit-length capacitance matrix relevant up to a given maximum frequency, by using suitably proportioned transmission conductors.

According to the invention, the linear combinations realized in a transmitting circuit and the linear combinations realized in a receiving circuit are implemented by a digital processing. Such an implementation is not described in the above-mentioned French patent application no. 0300064 nor in the international application no. PCT/EP03/15036.

According to the invention, the signals to be sent may be analog signals or digital signals.

In the case where the transmission channels are used to send digital signals, the digital signals applied to the input of a transmitting circuit may for instance be directly used as an input for the digital processing performed by the transmitting circuit, and, in the same way, the digital signals resulting from the digital processing performed by a receiving circuit may for instance be directly applied to the output of the receiving circuit.

In the case where the transmission channels are used to send analog signals, the analog signals applied to the input of a transmitting circuit must be converted into digital signals prior to being used as an input for the digital processing performed by the transmitting circuit, and, in the same way, the digital signals resulting from the digital processing performed by a receiving circuit must be converted into analog signals prior to being applied to the output of the receiving circuit.

According to the invention, the modal electrical variables generated by a transmitting circuit are each proportional to a single signal among the input signals. Since m signals must be sent, there are at least m modal electrical variables. According to the method of the invention, it is possible, in particular, to obtain the generation of m modal electrical variables at the output of a transmitting circuit. This may be the most economical procedure. However, it is also conceivable, when m is less than n, that more than m modal electrical variables are generated for the m input signals.

According to the method of the invention, the number m of transmission channels between any one of the transmitting circuits and any one of the receiving circuits may be equal to the number n of transmission conductors. This method is preferred because it is generally the most economical. However, it is also conceivable to use a number n of transmission conductors, greater than the number m of channels.

According to the method of the invention, the electrical variables may be either all voltages or all electric currents.

According to the method of the invention, conductors and dielectrics may be used such that the section of the interconnection in a plane orthogonal to the direction of propagation does not change, except for a scale factor, over the greatest part of the length of the interconnection, in the vicinity of the transmission conductors. The person skilled in the art knows that this condition indeed allows maintaining practically uniform electrical characteristics over the length of the interconnection.

Note that, in many possible cases, as the person skilled in the art knows, we can consider that, when computing the matrices $Z_C$, S and T of the multiconductor transmission line, the losses are negligible in some frequency bands, for instance for frequencies greater than 100 kHz, and that in this case, the characteristic impedance matrix is real and frequency-independent, and the matrices S and T chosen may be real and frequency-independent. However, in the case of interconnections inside integrated circuits (on-chip interconnects) we note that, because of the small cross-section of the conductors, this result might be obtained only at much higher frequencies, for instance at frequencies higher than 1 GHz.

The person skilled in the art knows, for instance, from a computation based on the geometry of the conductors and insulators, on the conductivity of the conductors and on the permittivity and the losses of the insulators, how to determine the natural matrices L, R, C and G of a multiconductor transmission line, as a function of frequency. The person skilled in the art also knows how to measure these matrices. It is therefore clear that it is possible to accurately determine the characteristic impedance matrix of the multiconductor transmission line in any frequency interval, up to the maximum frequency for which the transmission line theory is applicable. This maximum frequency depends on the cross dimensions of the interconnection, and the person skilled in the art knows that it corresponds to the appearance of the first non-evanescent propagation modes other than the quasi-TEM modes. In this same frequency interval, it is obviously also possible to determine a "transition matrix from modal voltages to natural voltages" S and/or a "transition matrix from modal currents to natural currents" T, as a function of frequency, so as to define modal voltages and/or modal currents.

The characteristic impedance matrix and a suitable choice of the matrices S and/or T may therefore be determined, for instance, in two distinct contexts: firstly when the interconnection has been chosen and the method of the invention must be applied to the interconnection by adapting the other parts of a device implementing this method, secondly when the parts of a device implementing this method, other than the interconnection, have been defined beforehand, and an appropriate interconnection should be designed.

According to the invention, the digital processing performed in a transmitting circuit and/or the digital processing performed in a receiving circuit may for instance be defined by a circuit, which may be a circuit defined by a wiring or a circuit defined by a program, as in a programmable logic device.

According to the invention, the digital processing performed in a transmitting circuit and/or the digital processing performed in a receiving circuit may be defined by a program, which may for instance be the program of a microcontroller or of a digital signal processor.

A device for proportioning the circuits used in a method of the invention is described in the next sentence. A device for proportioning the circuits used in a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, may comprise:

means for modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

means for determining, for the multiconductor transmission line and the known frequency band, the characteristic impedance matrix and a transition matrix from modal electrical variables to natural electrical variables;

means for proportioning a termination circuit having an impedance matrix approximating the characteristic impedance matrix;

means for proportioning one of the transmitting circuits which combines the m input signals, according to linear combinations defined by the transition matrix from modal electrical variables to natural electrical variables, using a digital processing and a conversion of the digital signals produced by the digital processing into n analog signals, so as to obtain at the output of said one of the transmitting circuits, output being connected to the n transmission conductors, the generation of modal electrical variables, each being proportional to a single signal among the input signals; and means for proportioning one of the receiving circuits, the input of which is connected to the n transmission conductors, which combines the analog signals present on the transmission conductors, according to linear combinations defined by the inverse of the transition matrix from modal electrical variables to natural electrical variables, using a conversion of the n analog signals into digital signals and a digital processing of the digital signals produced by the conversion, so as to obtain at the output of said one of the receiving circuits in output signals each corresponding to one of the transmission channels, each output signal being proportional to a single modal electrical variable among the modal electrical variables.

The device for proportioning the circuits used in a method of the invention may be such that the means for modeling the interconnection comprise means for measuring and/or for computing the real electrical characteristics of the interconnection, based on the relative layout of the transmission conductors and the reference conductor, and on the characteristics of the dielectrics surrounding them.

The device for proportioning the circuits used in a method of the invention may be such that the means for modeling the interconnection comprise:

means for calculating one or more error coefficients for variance between the actual electrical characteristics of the interconnection and the desired characteristics, for the known frequency band; and means for optimizing the relative position of the transmission conductors by minimizing the error coefficient or coefficients.

For instance, in the case where the digital processing performed in a transmitting circuit and/or the digital processing performed in a receiving circuit are defined by the program of a programmable logic device or by the program of a digital signal processor, the device for proportioning the circuits used in a method of the invention could automatically generate a part or the whole of such a program.

The device for proportioning the circuits used in a method of the invention may be such that the means for proportioning one of the transmitting circuits and the means for proportioning one of the receiving circuits take into account the errors related to sampling, quantization and any approximations used to define the digital processing of the transmitting circuits and of the receiving circuits.

The person skilled in the art fully understands that the digital processing tasks mentioned above are not intended to exactly correspond to an ideal analog characteristic such as the realization of linear combinations defined by the transition matrix from modal electrical variables to natural electrical variables or its inverse, but are rather intended to provide an approximation sufficiently close to an ideal analog characteristic. The analysis of errors related to sampling, quantization and approximations is therefore very pertinent.

A device for implementing the method of the invention is described in the next sentence. A device for transmission providing, in a known frequency band, m transmission channels each corresponding to a signal to be sent from the input of at least one transmitting circuit to the output of at least one receiving circuit, where m is an integer greater than or equal to 2, comprises:

an interconnection with n transmission conductors and a reference conductor, n being an integer greater than or equal to m, the interconnection being proportioned in such a way that the interconnection may, taking into account the lumped impedances seen by the interconnection and caused by the circuits connected to the interconnection elsewhere than at the ends of the interconnection, be modeled as a multiconductor transmission line having uniform electrical characteristics over its length for the known frequency band;

one or two termination circuits, each arranged at one end of the interconnection and each having, in the known frequency band, an impedance matrix approximating the characteristic impedance matrix of the multiconductor transmission line, the termination circuits, if there are several termination circuits, being each arranged at a different end of the interconnection;

at least one of the transmitting circuits for combining the m input signals, according to linear combinations defined by a transition matrix from modal electrical variables to natural electrical variables, using a digital processing and a conversion of the digital signals produced by the digital processing into n analog signals, in order to obtain at the output of said one of the transmitting circuits, output being connected to the n transmission conductors, the generation of modal electrical variables, each being proportional to a single signal among the input signals; and at least one of the receiving circuits, the input of which is connected to the n transmission conductors, for combining the analog signals present on the transmission conductors, according to linear combinations defined by the inverse of the transition matrix from modal electrical variables to natural electrical variables, using a conversion of the n analog signals into digital signals and a digital processing of the digital signals produced by the conversion, so as to obtain at the output of said one of the receiving circuits m output signals each corresponding to one of the transmission channels, each output signal being proportional to a single modal electrical variable among the modal electrical variables.

Note that, as mentioned above, a device for implementing the method of the invention may:

either comprise only at one end of the interconnection, a termination circuit with an impedance matrix near the characteristic impedance matrix, or comprise at both ends of the interconnection, a termination circuit with an impedance matrix near the characteristic impedance matrix.

In a device for implementing the method of the invention, it is possible to obtain the generation of m modal electrical variables at the output of a transmitting circuit.

In a device for implementing the method of the invention, it is possible that the number m of transmission channels between any one of the transmitting circuits and any one of the receiving circuits is equal to the number n of transmission conductors.

In the case where m=n, each mode has a corresponding transmission channel. Let $X_I$ be the column-vector of the n input signals $x_{I1}, \ldots, x_{In}$ of a transmitting circuit, and let $X_o$ be the column-vector of the n output signals $x_{o1}, \ldots, x_{on}$ of a receiving circuit. These signals may for instance be voltages or currents. According to the invention, at a given frequency, there is a proportionality between each modal voltage produced by a transmitting circuit and the input signal of the corresponding channel. Using a suitable numbering of the input signals, we may therefore write:

$$V_M = \text{diag}_n(\alpha_1, \ldots, \alpha_n) X_I \quad (1)$$

where $V_M$ is the column-vector of the modal voltages produced by the transmitting circuit, and $\text{diag}_n(\alpha_1, \ldots, \alpha_n)$ is the diagonal matrix of the non-zero proportionality coefficients $\alpha_i$. The dimensions of each of these coefficients depend upon the dimensions of the input signals; if for instance these input signals are voltages, the coefficients $\alpha_i$ will be dimensionless. Therefore, we see that the transmitting circuit must produce, on each conductor, at its point of connection to the interconnection, the natural voltages of the column-vector V given by:

$$V = S \text{ diag}_n(\alpha_1, \ldots, \alpha_n) X_I \quad (2)$$

Moreover, given that, for each channel, a receiving circuit produces at its output, a signal practically proportional to the modal voltage corresponding to the channel, we may, with a suitable numbering of the output signals, write that:

$$X_0 = \text{diag}_n(\beta_1, \ldots, \beta_n) V_M \quad (3)$$

where $V_M$ is the column-vector of the modal voltages received by the receiving circuit, and $\text{diag}_n(\beta_1, \ldots, \beta_n)$ is the diagonal matrix of the non-zero proportionality coefficients $\beta_i$. The dimensions of these coefficients depend upon the dimensions of the output signals: if for instance the output signals are currents, $\beta_i$ will have the dimensions of admittance. We see that the receiving circuit must read the set of conductors, to obtain the modal voltages. Therefore, if, at the connection point of the receiving circuit to the interconnection, the column-vector of the natural voltages is V, the output signals are given by:

$$X_0 = \text{diag}_n(\beta_1, \ldots, \beta_n) S^{-1} V \quad (4)$$

Given that, according to the invention, the waves propagate on the interconnection as they would in a uniform multiconductor transmission line, without significant reflection at the ends, it is possible, using equations (1) and (3), to clarify how the transmission of signals takes place. Between a transmitting circuit and a receiving circuit whose connection points to the interconnection show a difference of curvilinear abscissa $\Delta L$, for any integer i between 1 and n included, we obtain:

$$x_{oi} = \alpha_i \beta_i e^{-\gamma_i |\Delta L|} x_{Ii} \quad (5)$$

where $\gamma_i$ is a propagation constant for the mode i.

According to (2), this transmitting circuit must produce, for any one of its output terminals i, the linear combination of the signals of the input channels using the coefficients of the i-th line-vector of the matrix obtained by multiplying each column j of the matrix S by a coefficient $\alpha_j$. According to (4), the receiving circuit mentioned above must produce, for any one of its output channels i, the linear combination of the voltages at its input terminals using the coefficients of the i-th line-vector of the matrix $S^{-1}$ multiplied by the coefficient $\beta_i$.

Such linear combinations, the coefficients of which may be complex and frequency-dependent, may be realized using an appropriate digital processing implementing techniques well known to specialists in digital signal processing. Thus, in the most general case, the equations (2) and (4) may each be viewed as the definition of n linear circuits each having n inputs and one output, the output of such a linear circuit being the sum of n elementary filters each having one input and one output. Each of these elementary filters is defined by a coefficient that may depend on the frequency. This coefficient is the transfer function of the elementary filter. Specialists know that they may use conventional techniques for designing digital filters to obtain a suitable approximation of such an analog transfer function. For instance, the specialist may, after having defined a sampling frequency, calculate the coefficients of a finite impulse response filter and choose a structure for realizing this filter. Each of the linear circuits mentioned above may then for instance be realized by summing the outputs of the elementary filters designed in this manner.

A device for implementing the method of the invention may be such that the electrical variables are either all voltages or all electric currents, and the two formulations are in fact equivalent. Instead of equations (1) to (4), note that we could also have written, for a transmitting circuit $$I_M = \text{diag}_n(\alpha_1, \ldots, \alpha_n) X_I \quad (6)$$

$$I = T \text{diag}_n(\alpha_1, \ldots, \alpha_n) X_I \quad (7)$$

where $I_M$ is the column-vector of the modal currents produced by the transmitting circuit, I is the column-vector of the corresponding natural currents, and $\text{diag}_n(\alpha_1, \ldots, \alpha_n)$ is the diagonal matrix of the non-zero proportionality coefficients $\alpha_i$, and, for a receiving circuit $$X_O = \text{diag}_n(\beta_1, \ldots, \beta_n) I_M \quad (8)$$

$$X_O = \text{diag}_n(\beta_1, \ldots, \beta_n) T^{-1} I \quad (9)$$

where $I_M$ is the column-vector of the modal currents received by the receiving circuit, I is the column-vector of the corresponding natural currents, and $\text{diag}_n(\beta_1, \ldots, \beta_n)$ is the diagonal matrix of the non-zero proportionality coefficients $\beta_i$. The proportionality coefficients appearing in equations (1) to (5) are obviously not the same as the ones appearing in equations (6) to (9).

In a device for implementing the method of the invention, it is possible that the section of the interconnection in a plane orthogonal to the direction of propagation does not change, except for a scale factor, over the greatest part of the length of the interconnection, in the vicinity of the transmission conductors.

A device for implementing the method of the invention may preferentially be such that the known frequency band contains frequencies between 100 kHz and 100 GHz.

We have already mentioned that it is often possible, for instance at frequencies greater than 100 kHz, to obtain real and frequency-independent matrices $Z_C$, S and T. In this case, it is clear for the person skilled in the art that a termination circuit having, in the known frequency band, an impedance matrix approximating the characteristic impedance matrix, could for instance be made of a network of resistors, and the computations needed to proportion this network are not difficult.

A device for implementing the method of the invention may be such that the termination circuit(s) is(are) made up of a network of resistors.

Termination circuits made of a network of resistors are however not at all a characteristic of the invention. By way of example, designers may, in order to limit the power consumed by a signal present at the terminals of termination circuits, choose to allow these terminals to be effective only in a relevant interval of frequency, for instance by including suitable reactive circuit elements in the termination circuits. Another example is that termination circuits could include active circuit elements.

In the case where real and frequency-independent matrices $Z_C$, S and T are considered, and where the chosen coefficients $\alpha_i$ and $\beta_i$ of the equations (1) to (9) are real and frequency-independent, it is also clear for the person skilled in the art that the elementary filters defined above for the realization of the linear combinations to be used in the transmitting circuits and in the receiving circuits each have a transfer function equal to a frequency-independent real number. These elementary filters then each correspond to a mere gain in the digital processing structure.

In the case where it may be useful to take losses into account when determining the matrices $Z_C$, this matrix is not real and frequency-independent any longer, and it becomes necessary to synthesize the termination circuits, using methods well known to the persons skilled in the art. Termination circuits synthesized in this manner include reactive circuit elements.

In the case where it may be useful to take losses into account when determining the matrices S and T, it is likely that these matrices are not real and frequency-independent any longer. The elementary filters defined above for the realization of the linear combinations to be used in the transmitting circuits and in the receiving circuits each have a transfer function which is a priori no longer equal to a frequency-independent real number. It therefore becomes necessary to synthesize these elementary filters using any of the many methods known to specialists, with a suitable approximation, as mentioned above. This approximation may for instance be based on minimizing error, for instance using a conventional method such as the least-squared error design.

According to the invention, it is specified that it must be possible to model the interconnection as a multiconductor transmission line having uniform electrical characteristics over its length for the known frequency band, taking into account the lumped impedances seen by the interconnection and caused by the circuits connected to it elsewhere than at its ends. In order to take these lumped impedances into account by merely stating that they are not present or that they may be ignored, these circuits must be such that they do not disturb the propagation along the multiconductor transmission line. The person skilled in the art sees that this result can for instance be obtained by:

using transmitting circuits and/or receiving circuits connected in series with the conductors of the interconnection, and showing a low series impedance, using transmitting circuits and/or receiving circuits connected in parallel with the conductors of the interconnection, and showing a high parallel impedance.

A device for implementing the method of the invention may therefore be such that the transmitting circuit(s) and the receiving circuit(s) are connected in parallel with the interconnection, and such that the interconnection sees a high impedance in the connections of the transmitting circuit(s) and of the receiving circuit(s). In this case, the designer may well consider that the transmitting circuit operates as a current source, and use equation (7). Alternatively, the designer may use the voltage angle and apply equation (2) considering that:

if the device for implementing the method of the invention is such that only one end of the interconnection is connected to a termination circuit with an impedance matrix near the characteristic impedance matrix, then the other end is connected to the transmitting circuit having a high impedance, consequently the output of the transmitting circuit sees an impedance matrix near $Z_C$, and therefore $$I = Z_C^{-1} S \text{ diag}_n(\alpha_1, \ldots, \alpha_n) X_I \quad (10)$$

if the device for implementing the method of the invention is such that both ends of the interconnection are connected to a termination circuit with an impedance matrix near the characteristic impedance matrix, then the output of the transmitting circuit sees an impedance matrix near $Z_C/2$, and therefore $$I = 2Z_C^{-1} S \text{ diag}_n(\alpha_1, \ldots, \alpha_n) X_I \quad (11)$$

The designer shall of course keep in mind that $\text{diag}_n(\alpha_1, \ldots, \alpha_n)$ does not mean the same thing in equation (7) and in equations (2), (10) and (11).

However, the connection of the transmitting circuits and/or the receiving circuits in parallel with the interconnection is not at all a characteristic of the invention. According to the invention, the transmitting circuit(s) and/or the receiving circuit(s) may be connected in series with the interconnection, in which case they must generally show a low series impedance to the interconnection, in order not to disturb the propagation of waves along the interconnection.

According to the prior art, the person skilled in the art knows that the crosstalk in an interconnection having parallel conductors is low at low frequencies, and that it strongly depends both on the frequency and on the length of the interconnection. These properties usually limit the maximum length of the interconnection and its maximum frequency of operation. A device of the invention, in which we observe that the crosstalk that can be calculated, depends little on the frequency and the length of the interconnection, does away with these limitations.

The prior art required, for obtaining very low crosstalk on interconnections, that they have a complex three-dimensional structure, that they contain for instance a twisted pair for each channel, or a screen for each channel. According to the invention, reduced crosstalk may be obtained merely by using an interconnection with parallel conductors, hence cutting down cost and size.

Finally, we note that according to the prior art, the desired propagation of a signal on a single conductor corresponds to the propagation of several modes, at different propagation velocities, causing a modal dispersion well known to specialists. In the time domain, this modal dispersion distorts the signals. According to the invention, each signal is propagated using a single mode. There is therefore no modal dispersion, which increases the passband of the interconnection and the maximum length it may have.

Thus, according to the invention, in a transmission channel i, only one propagation constant $\gamma_i$ plays a part in the propagation of signals, as expressed by the equation (5). However, the propagation constants applicable to the different transmission channels may be different, leading to different phase velocities, and therefore to different propagation times between a given transmitting circuit and a given receiving circuit, for the different channels. However, this characteristic of the interconnection may be offset in an apparatus of the invention, because it may be designed to delay, in a transmitting circuit and/or in a receiving circuit, the signals of the transmission channels providing the fastest propagation, in such a way that the propagation times between the input of a transmitting circuit and the output of a receiving circuit approach the same value. We note that implementing such delays requires frequency-dependent proportionality coefficients $\alpha_i$ and/or $\beta_i$, because the transfer function of a pure delay is an exponential function having an imaginary argument proportional to the frequency. The implementation of such delays is not difficult. For instance, delays equal to the sampling period multiplied by a whole number are easily obtained in a digital processing. For instance, arbitrary delays may also be introduced using well known analog delay circuits.

A device for implementing the method of the invention may therefore implement, in at least one of the transmitting circuits and/or one of the receiving circuits, different delays for the different transmission channels.

When the losses of the interconnection are negligible, the phase velocities associated with the propagation constants of the different transmission channels do not depend on the frequency, and the propagation along the interconnection produces delays in the different channels, without distortion of the propagated signals. This does not hold when the losses are not negligible. In this case, in a transmission channel i, a propagation constant $\gamma_i$ may correspond to a frequency-dependent phase velocity and a frequency-dependent attenuation constant, resulting in phase and amplitude distortions described by the equation (5), which are referred to as distortions caused by propagation. In a device for implementing the method of the invention, the distortions may be reduced using an equalization reducing the effects of the distortions caused by propagation, implemented in the digital processing of at least one of the transmitting circuits and/or one of the receiving circuits, on one or more transmission channels. This type of processing is well known to specialists, and is for instance commonly used in modems. We note that implementing such an equalization requires frequency-dependent proportionality coefficients $\alpha_i$ and/or $\beta_i$, because the transfer function corresponding to the ideal equalization of a transmission channel i is an exponential function whose argument depends on $\gamma_i$.

Specialists know that it is commonplace to use adaptive algorithms for implementing this type of processing in receivers for data transmission.

A device for implementing the method of the invention may therefore implement, in at least one of the receiving circuits, a digital processing including an adaptive equalization for one or more transmission channels. In this case, the proportionality coefficients $\beta_i$ are frequency-dependent and are adapted to minimize the distortion observed in the transmission channel.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
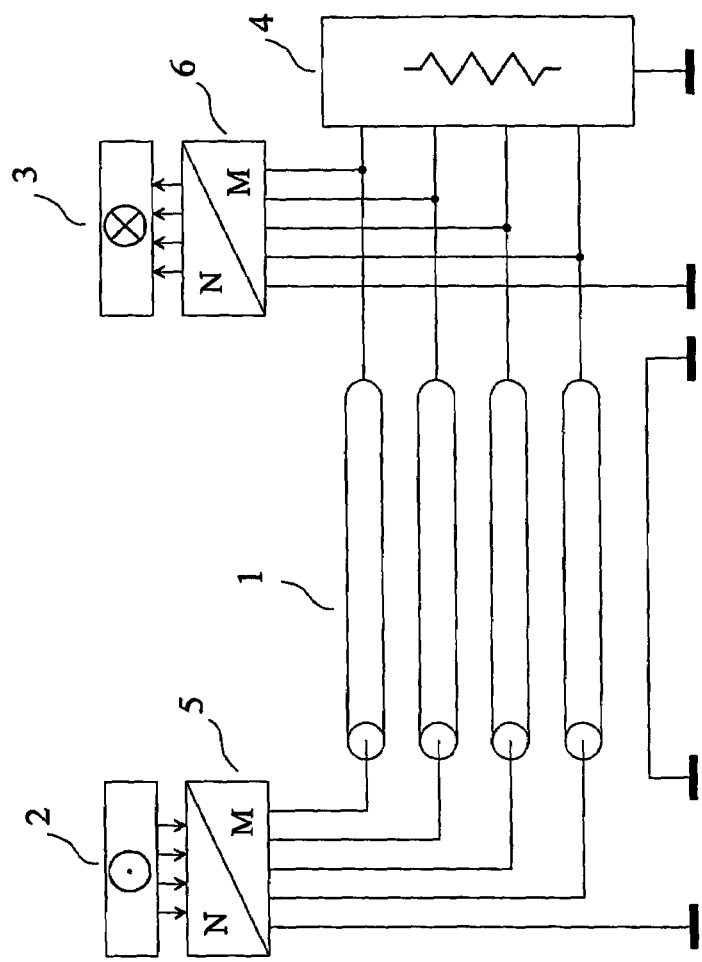
FIG. 1 shows a first and a second embodiment of the invention.

As a first example of a device for implementing the method of the invention, given by way of non-limiting example, we have represented in FIG. 1 a device of the invention comprising an interconnection (1) having four parallel transmission conductors and a reference conductor. The transmission conductors numbered 1, 2, 3 and 4 (this numbering is not shown in FIG. 1) may be the conductors of a flat cable fitted with a screen (or shielding), this screen being used as reference conductor. In FIG. 1, only one end of the interconnection is connected to a termination circuit (4) presenting an impedance matrix approximating the characteristic impedance matrix in a known frequency band. The transmitting circuit (5) receives at its input the signals of the four channels of the source (2), and its four output terminals are connected to the conductors of the interconnection, this transmitting circuit producing modal voltages on these conductors, each modal voltage being proportional to the signal of a different channel. The receiving circuit (6) has its input terminals connected to the conductors of the interconnection, this receiving circuit (6) producing four signals at its output terminals connected to the destination (3), each signal being proportional to one of the modal voltages appearing on these conductors. Thus, the signals of the four channels of the source (2) are sent to the four channels of the destination (3), without noticeable crosstalk.

Note that, in the device of FIG. 1, the receiving circuit (6) must be such that its connection in parallel with the termination circuit (4) does not significantly alter the values of the impedance matrix connected to the end of the line. The receiving circuit (6) must therefore present a high impedance to the interconnection (1), such that the interconnection (1) indeed sees at this end an impedance matrix nearing that of the termination circuit (4).

Note that, in the device of FIG. 1, the transmitting circuit (5) can on the contrary show any impedance to the interconnection (1), because no incident wave can reach the end of the interconnection (1) to which the transmitting circuit (5) is connected. For that very reason, there is no termination circuit connected to this end of the interconnection.

In the first example of a device for implementing the method of the invention, the signals sent from the source (2) to the destination (3) are digital signals. Taking into account the characteristics resulting from the proportioning of the interconnection and the spectrum of these signals, the designer has established that the losses could be ignored, and consequently considered real and frequency-independent matrices for $Z_C$, S and T. The termination circuit (4) has therefore been designed as a simple network of 10 resistors.

Figure 2:
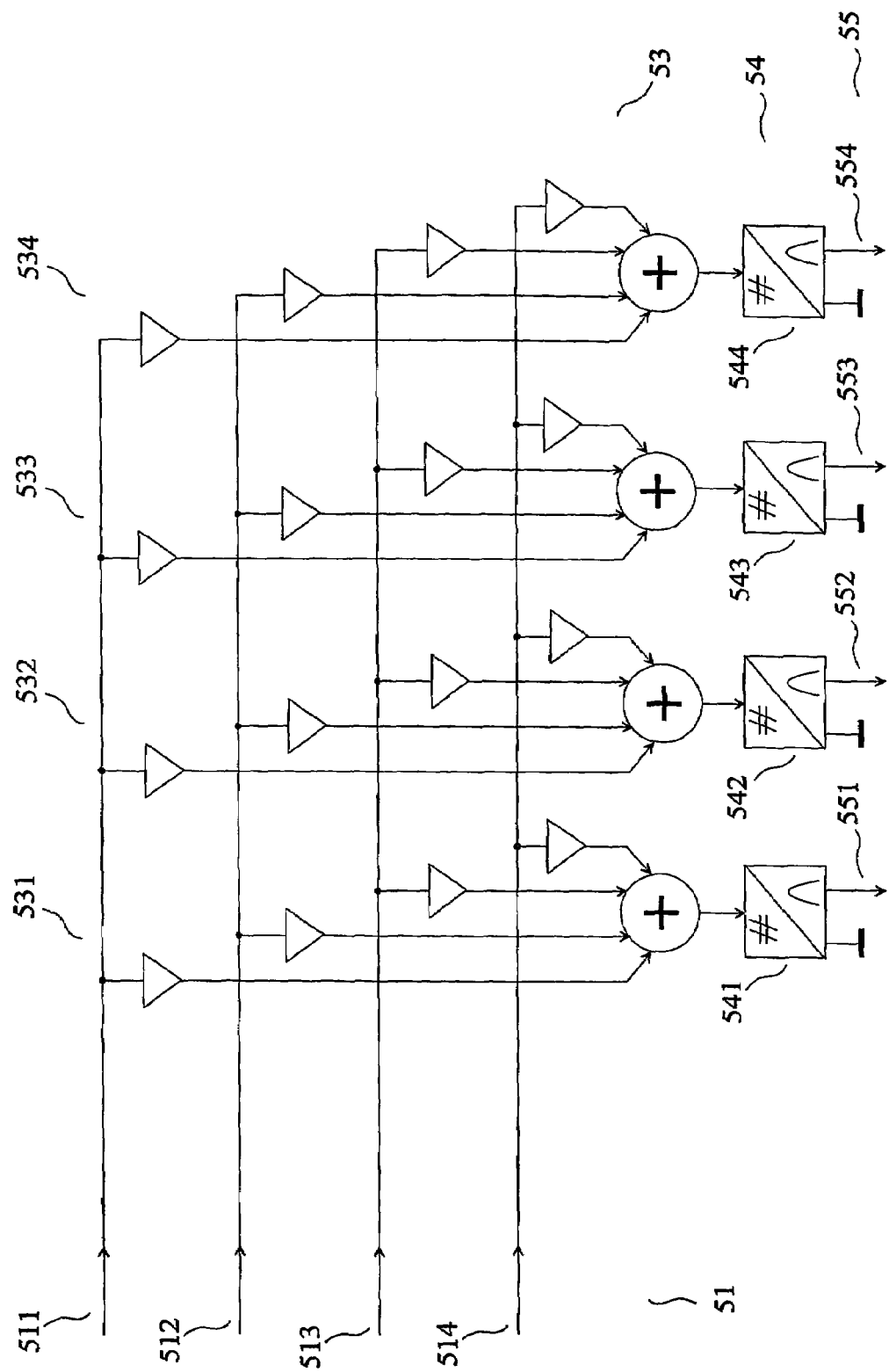
FIG. 2 shows the transmitting circuit of the first embodiment of the invention.

FIG. 2 shows a schematic diagram of the transmitting circuit (5) which implements the linear combinations specified by the equation (2) with real and frequency-independent proportionality coefficients $\alpha_i$. The input (51) of the transmitting circuit has four input nodes (511), (512), (513) and (514), one for each of the four transmission channels. The digital processing corresponding to the equation (2) applied to the input signals is performed in a structure (53) made of four linear circuits (531), (532), (533) and (534) each having four inputs and one output. The output of each linear circuit is the sum of the outputs of four elementary filters with one input and one output, each merely corresponding to gain block because each has a transfer function equal to a frequency-independent real constant. The digital signals processed in this manner are converted into four analog signals in a conversion unit (54) made up of four digital-to-analog converters (541), (542), (543) and (544), each having its output connected to one of the four terminals (551), (552), (553) and (554) of the output (55) of the transmitting circuit. The gains of the elementary filters are such that the modal voltages appearing on the four transmission conductors are each proportional to only one of the four signals applied to the input (51).

The structure (53) performing the digital processing is implemented here with a digital signal processor program. The structure (53) therefore does not correspond to hardware elements, whereas the conversion unit (54) and the output (55) exist physically.

Figure 3:
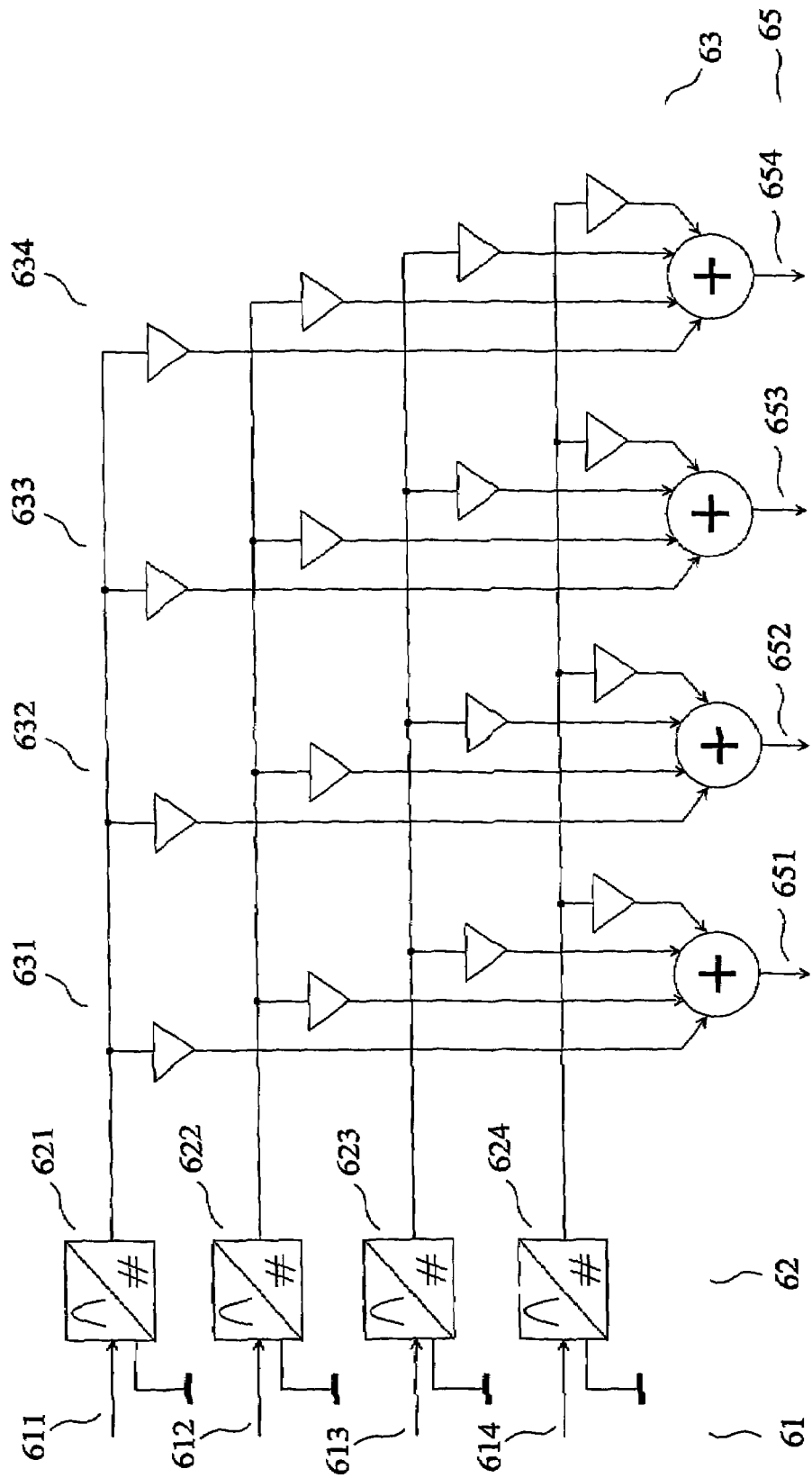
FIG. 3 shows the receiving circuit of the first embodiment of the invention.

FIG. 3 shows a schematic diagram of the receiving circuit (6) which implements the linear combinations specified by the equation (4) with real and frequency-independent proportionality coefficients $\beta_i$. The input (61) of the receiving circuit has four input terminals (611), (612), (613) and (614), one for each of the four transmission conductors. The analog signals appearing on these input terminals are converted into four digital signals in a conversion unit (62) made up of four analog-to-digital converters (621), (622), (623) and (624). The digital processing corresponding to the equation (4) applied to the signals converted in this manner is performed in a structure (63) made up of four linear circuits (631), (632), (633) and (634) each having four inputs and one output. The output of each linear circuit is the sum of the outputs of four elementary filters with one input and one output, each merely corresponding to a gain block because each has a transfer function equal to a frequency-independent real constant. The digital signals processed in this manner are applied to the four output nodes (651), (652), (653) and (654) of the output (65) of the receiving circuit. The gains of the elementary filters are such that the signals at these four output nodes are each proportional to only one of the four modal voltages appearing on the four transmission conductors.

The structure (63) performing the digital processing is implemented here with a digital signal processor program. The structure (63) therefore does not correspond to hardware elements, whereas the conversion unit (62) and the input (61) exist physically.

Second Embodiment

Our second example of a device for implementing the method of the invention, given by way of non-limiting example, also corresponds to the device represented in FIG. 1. This device of the invention comprises an interconnection (1) and a termination circuit (4) which are identical to the ones of the first example of a device for implementing the method of the invention.

The transmitting circuit (5) receives at its input the signals of the four channels of the source (2), and its four output terminals are connected to the conductors of the interconnection, this transmitting circuit producing modal voltages on these conductors, each modal voltage being proportional to the signal of a different channel. The receiving circuit (6) has its input terminals connected to the conductors of the interconnection, this receiving circuit (6) producing four signals at its output terminals connected to the destination (3), each signal being proportional to one of the modal voltages appearing on these conductors.

In this second example of a device for implementing the method of the invention, the signals sent by the source (2) to the destination (3) are analog signals. Taking into account the characteristics resulting from the proportioning of the interconnection and the spectrum of these signals, the designer has established that the losses may be ignored, and consequently used real and frequency-independent matrices for $Z_C$, S and T. The termination circuit (4) has therefore been designed as a simple network of 10 resistors.

Figure 4:
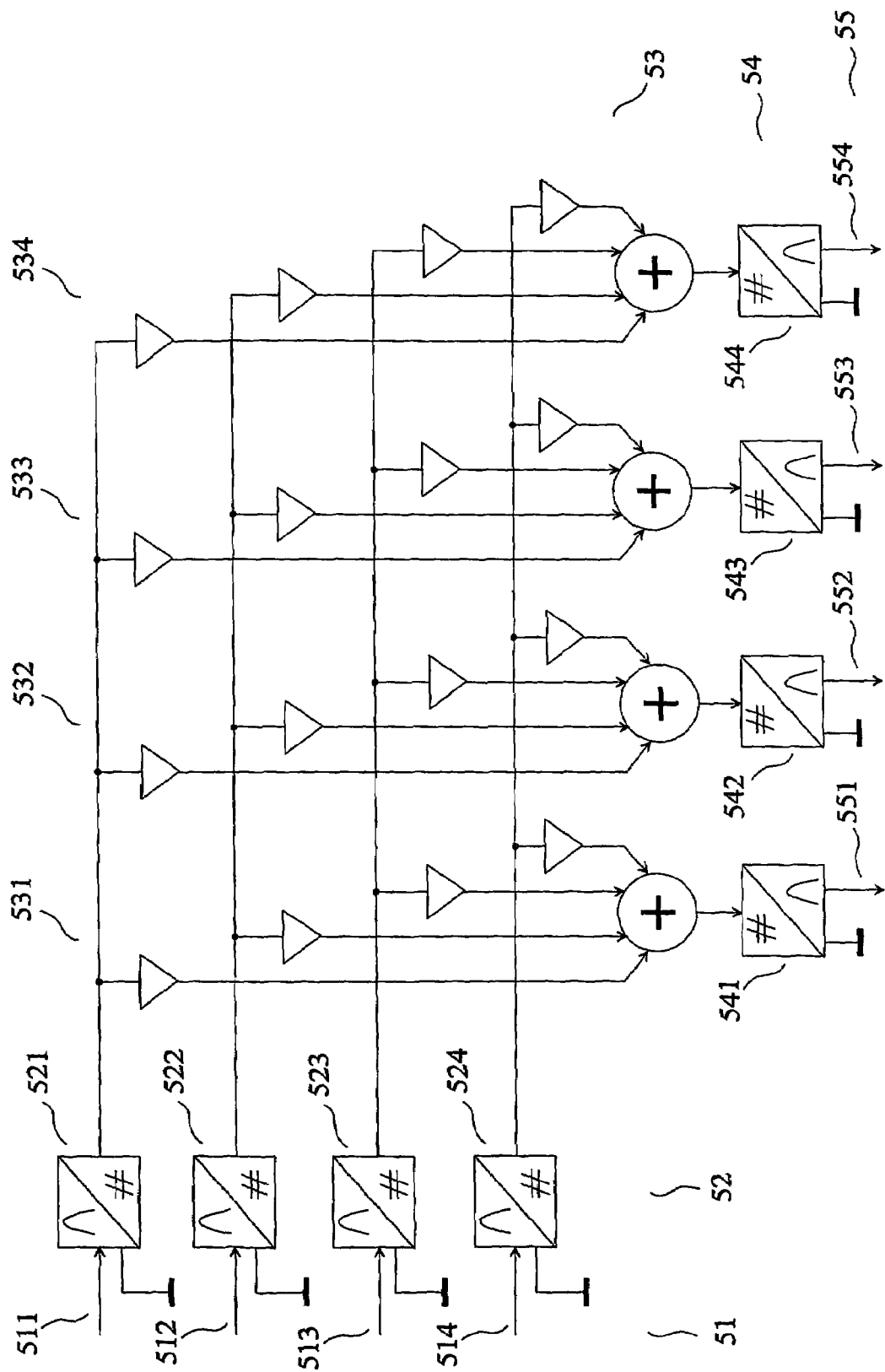
FIG. 4 shows the transmitting circuit of the second embodiment of the invention.

FIG. 4 shows a schematic diagram of the transmitting circuit (5) which implements the linear combinations specified by the equation (2) with real and frequency-independent proportionality coefficients $\alpha_i$. The input (51) of the transmitting circuit has four input terminals (511), (512), (513) and (514), one for each of the four transmission channels. The analog signals appearing on these input terminals are converted into four digital signals in a conversion unit (52) made up of four analog-to-digital converters (521), (522), (523) and (524). The digital processing corresponding to the equation (2) applied to the input signals converted in this manner is performed in a structure (53) made up of four linear circuits (531), (532), (533) and (534), each having four inputs and one output. The output of each linear circuit is the sum of the outputs of four elementary filters with one input and one output, each merely corresponding to gain block because each has a transfer function equal to a frequency-independent real constant. The digital signals processed in this manner are converted into four analog signals in a conversion unit (54) made up of four digital-to-analog converters (541), (542), (543) and (544), each having its output connected to one of the four terminals (551), (552), (553) and (554) of the output (55) of the transmitting circuit. The gains of the elementary filters are such that the modal voltages appearing on the four transmission conductors are each proportional to only one of the four signals applied to the input (51).

Figure 5:
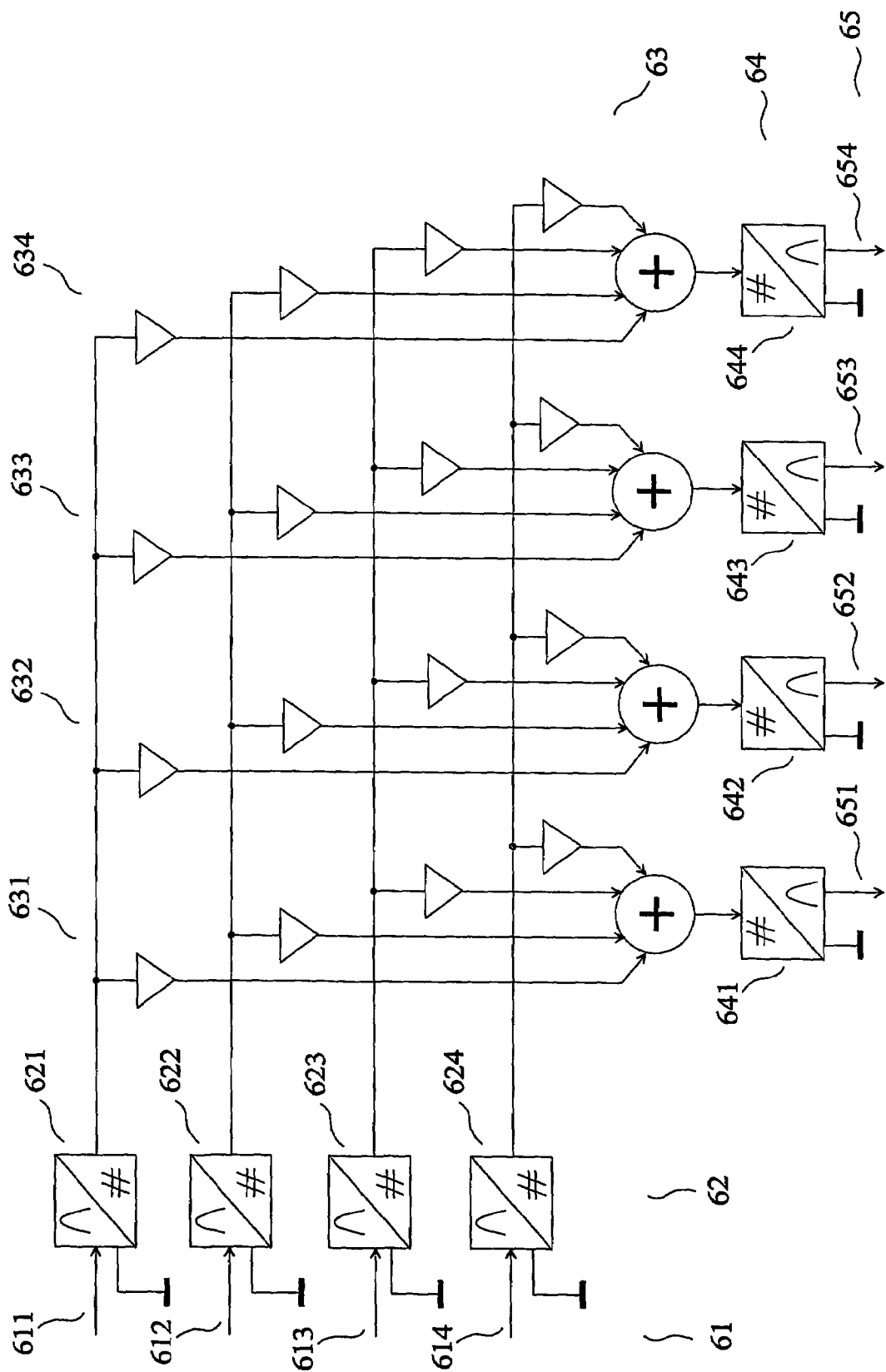
FIG. 5 shows the receiving circuit of the second embodiment of the invention.

FIG. 5 shows a schematic diagram of the receiving circuit (6) which implements the linear combinations specified by the equation (4) with real and frequency-independent proportionality coefficients $\beta_i$. The input (61) of the receiving circuit has four input terminals (611), (612), (613) and (614), one for each of the four transmission conductors. The analog signals appearing on these input terminals are converted into four digital signals in a conversion unit (62) made up of four analog-to-digital converters (621), (622), (623) and (624). The digital processing corresponding to the equation (4) applied to the signals converted in this manner is performed in a structure (63) made up of four linear circuits (631), (632), (633) and (634) each having four inputs and one output. The output of each linear circuit is the sum of the outputs of four elementary filters with one input and one output, each merely corresponding to a gain block because each has a transfer function equal to a frequency-independent real constant. The digital signals processed in this manner are converted into four analog signals in a conversion unit (64) made up of four digital-to-analog converters (641), (642), (643) and (644), each having its output connected to one of the four terminals (651), (652), (653) and (654) of the output (65) of the receiving circuit. The gains of the elementary filters are such that the signals at these four output nodes are each proportional to only one of the four modal voltages appearing on the four transmission conductors.

Third Embodiment (Best Mode)

Figure 6:
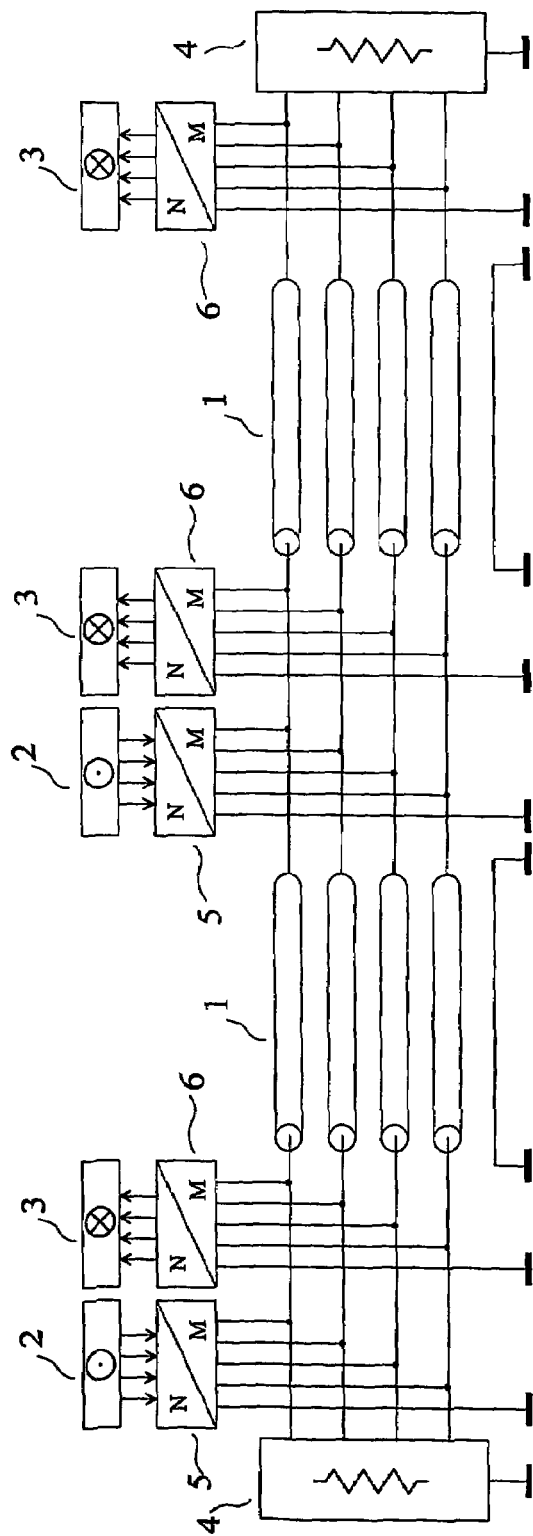
FIG. 6 shows a third embodiment of the invention (best mode).

As a third example of a device for implementing the method of the invention, given by way of non-limiting example and best mode of carrying out the invention, we have represented in FIG. 6 a device of the invention, comprising an interconnection (1) having four parallel transmission conductors, and a reference conductor. The interconnection is connected at each end to a termination circuit (4). Two transmitting circuits (5) placed at two different abscissa z, receive at their inputs the signals from the four channels of each of the two sources (2), these transmitting circuits (5) producing, when they are active, modal voltages, each being proportional to the signal of one channel. Note that this is a data bus architecture, and that the signals needed to obtain the active state of at most one transmitting circuit at a given time are not shown in FIG. 6. The three receiving circuits (6) placed at three different abscissa z, have their input terminals connected to the conductors of the interconnection, each of these receiving circuits (6) producing output signals being each proportional to a different modal voltage, at its output terminals connected to the destination (3). Thus, the signals of the four channels of a source (2), connected to an active transmitting circuit (5), are sent to the four channels of the destinations (3) without noticeable crosstalk.

Note that, in the device of FIG. 6, the transmitting circuits (5) and the receiving circuit (6), being connected in parallel with the interconnection (1), must present a high impedance to the interconnection (1), in order not to disturb the propagation of waves along the interconnection (1) in a detrimental way, and in order not to produce undesirable reflections at the ends of the interconnection (1). In the device of FIG. 6, both termination circuits (4) are necessary because waves coming from the interconnection (1) may be incident on both ends.

INDICATIONS ON INDUSTRIAL APPLICATIONS

According to the invention, it is possible to built into one or several items intended to be interconnected, for instance integrated circuits, a said transmitting circuit and/or a said receiving circuit, to be used for interconnections having predetermined characteristics, for instance a required drawing of the section of the interconnection orthogonal to the direction of propagation, for an implementation on an external layer of a printed circuit board using a substrate of epoxy-bonded fiberglass of specified permittivity. The designer integrating such items need only create an interconnection of any length and of said predetermined characteristics, and the termination circuits, in order to obtain a device of the invention. It is clear that this approach would be interesting for instance for items intended to be connected to a data bus, e.g. microprocessors or memories, or for instance for circuit boards intended to be connected to a backplane comprising the conductors of the interconnection.

According to the invention, the digital processing performed in at least one transmitting circuit and/or the digital processing performed in at least one receiving circuit may be defined by a program.

According to the invention, it is therefore possible to built into one or several items intended to be interconnected, for instance integrated circuits, a said transmitting circuit and/or a said receiving circuit, the digital processing of which may be programmed to accommodate any interconnection having a given maximum number of conductors, using a suitable proportioning of the program. The designer integrating such items would only have to proportion and create the interconnection, write the digital processing program, and create the termination circuits in order to obtain an apparatus of the invention. This approach is clearly more flexible than the previous one.

The invention is particularly suitable for cases where the transmission channels are used to send digital signals. In fact, in this case, a residual crosstalk coupling factor is acceptable, but the bandwidth to take into account is often very wide. According to the invention, this result is easily obtained in an inexpensive way, because it is compatible with the use of resistors of average accuracy.

As shown with the third embodiment, the invention is appropriate for an implementation wherein the interconnection is operated as a data bus.

The invention is particularly suitable for its implementation with microstrip structures and stripline structures, for instance on printed circuit boards. It is particularly beneficial to printed circuit boards comprising a wide band analog circuitry or fast digital circuits.

The invention is particularly suitable for reducing crosstalk in the internal interconnections of integrated circuits.

The invention is applicable in manufacturing computers that contain a large number of long interconnections for very fast signals.

The invention is also particularly suitable for reducing crosstalk in flat multiconductor cables. Flat cables used in a device of the invention could be used to send fast signals over long distances, for instance in applications such as local area networks and telecommunications.

The invention claimed is:

1. A method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the method comprising the steps of:

modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

determining, for the multiconductor transmission line and the known frequency band, the characteristic impedance matrix and a transition matrix from modal electrical variables to natural electrical variables;

placing at at least one end of the interconnection, a termination circuit having an impedance matrix approximating the characteristic impedance matrix;

combining the m input signals in one of the transmitting circuits, according to linear combinations defined by the transition matrix from modal electrical variables to natural electrical variables, using a digital processing and a conversion of the digital signals produced by the digital processing into n analog signals, so as to obtain at the output of said one of the transmitting circuits, output being connected to the n transmission conductors, the generation of modal electrical variables, each being proportional to a single signal among the input signals; and combining in one of the receiving circuits, the input of which is connected to the n transmission conductors, the analog signals present on the transmission conductors, according to linear combinations defined by the inverse of the transition matrix from modal electrical variables to natural electrical variables, using a conversion of the n analog signals into digital signals and a digital processing of the digital signals produced by the conversion, so as to obtain at the output of said one of the receiving circuits m output signals each corresponding to one of the transmission channels, each output signal being proportional to a single modal electrical variable among the modal electrical variables.

2. A device for proportioning the circuits used in a method for transmitting through an interconnection with n transmission conductors and a reference conductor, n being an integer greater than or equal to the method providing, in a known frequency band, m transmission channels each corresponding to a signal to be sent from the input of at least one transmitting circuit to the output of at least one receiving circuit, where m is an integer greater than or equal to and less than or equal to n, the device comprising:

means for modeling the interconnection, taking into account the lumped impedances seen by the interconnection and caused by the circuits connected to the interconnection elsewhere than at the ends of the interconnection, as a multiconductor transmission line having uniform electrical characteristics over its length for the known frequency band;

means for determining, for the multiconductor transmission line and the known frequency band, the characteristic impedance matrix and a transition matrix from modal electrical variables to natural electrical variables;

means for proportioning a termination circuit having an impedance matrix approximating the characteristic impedance matrix;

means for proportioning one of the transmitting circuits which combines the m input signals, according to linear combinations defined by the transition matrix from modal electrical variables to natural electrical variables, using a digital processing and a conversion of the digital signals produced by the digital processing into n analog signals, so as to obtain at the output of said one of the transmitting circuits, output being connected to the n transmission conductors, the generation of modal electrical variables; each being proportional to a single signal among the input signals; and means for proportioning one of the receiving circuits, the input of which is connected to the n transmission conductors, which combines the analog signals present on the transmission conductors, according to linear combinations defined by the inverse of the transition matrix from modal electrical variables to natural electrical variables, using a conversion of the n analog signals into digital signals and a digital processing of the digital signals produced by the conversion, so as to obtain at the output of said one of the receiving circuits m output signals each corresponding to one of the transmission channels, each output signal being proportional to a single modal electrical variable among the modal electrical variables.

3. The device of claim 2, wherein the means for modeling the interconnection comprise means for measuring and/or for computing the real electrical characteristics of the interconnection, based on the relative layout of the transmission conductors and the reference conductor, and on the characteristics of the dielectrics surrounding them.

4. The device of claim 2, wherein the means for modeling the interconnection comprise:
- means for calculating one or more error coefficients for variance between the actual electrical characteristics of the interconnection end the desired characteristics, for the known frequency band; and
- means for optimizing the relative position of the transmission conductors by minimizing the error coefficient or coefficients.

5. The device claim 2, wherein the means for proportioning one of the transmitting circuits and the means for proportioning one of the receiving circuits take into account the errors related to sampling, quantization and any approximations used to define the digital processing of the transmitting circuits and of the receiving circuits.

6. A device for transmission providing, in a known frequency band, m transmission channels each corresponding to a signal to be sent from the input of at least one transmitting circuit to the output of at least one receiving circuit, where m is an integer greater than or equal to 2, the device comprising:
- an interconnection with n transmission conductors and a reference conductor, n being an integer greater than or equal to m, the interconnection being proportioned in such a way that the interconnection may, taking into account the lumped impedances seen by the interconnection and caused by the circuits connected to the interconnection elsewhere than at the ends of the interconnection, be modeled as a multiconductor transmission line having uniform electrical characteristics over its length for the known frequency band;
- one or two termination circuits, each arranged at one end of the interconnection and each having, in the known frequency band, an impedance matrix approximating the characteristic impedance matrix of the multiconductor transmission line, the termination circuits, if there are several termination circuits, being each arranged at a different end of the interconnection;
- at least one of the transmitting circuits for combining the m input signals, according to linear combinations defined by a transition matrix from modal electrical variables to natural electrical variables, using a digital processing and a conversion of the digital signals produced by the digital processing into n analog signals, in order to obtain at the output of said one of the transmitting circuits, output being connected to the n transmission conductors, the generation of modal electrical variables, each being proportional to a single signal among the input signals; and
- at least one of the receiving circuits, the input of which is connected to the n transmission conductors, for combining the analog signals present on the transmission conductors, according to linear combinations defined by the inverse of the transition matrix from modal electrical variables to natural electrical variables, using a conversion of the n analog signals into digital signals and a digital processing of the digital signals produced by the conversion, so as to obtain at the output of said one of the receiving circuits m output signals each corresponding to one of the transmission channels, each output signal being proportional to a single modal electrical variable among the modal electrical variables.

7. The device of claim 6, wherein the generation of m modal electrical variables is obtained at the output of a transmitting circuit.

8. The device of claim 6, wherein the number m of transmission channels between any one of the transmitting circuits and any one of the receiving circuits is equal to the number n of transmission conductors.

9. The device of claim 6, wherein the section of the interconnection in a plane orthogonal to the direction of propagation does not change, except for a scale factor, over the greatest part of the length of the interconnection, in the vicinity of the transmission conductors.

10. The device of claim 6, wherein the termination circuit(s) is(are) made up of a network of resistors.

11. The device of claim 6, wherein the transmitting circuit(s) and the receiving circuit(s) are connected in parallel with the interconnection, and wherein the interconnection sees a high impedance in the connections of the transmitting circuit(s) and of the receiving circuit(s).

12. The device of claim 6, wherein, in at least one of the transmitting circuits and/or one of the receiving circuits, different delays are implemented for the different transmission channels.

13. The device of claim 6, wherein an equalization reducing the effects of the distortions caused by propagation is implemented in the digital processing of at least one of the transmitting circuits and/or one of the receiving circuits, on one or more transmission channels.

14. The device of claim 6, wherein a digital processing including an adaptive equalization for one or more transmission channels is implemented in at least one of the receiving circuits.

15. The device of claim 6, wherein the digital processing performed in at least one transmitting circuit and/or the digital processing performed in at least one receiving circuit is defined by a program.

16. The device of claim 6, wherein the interconnection is operated as a data bus.

* * * * *